United States Patent

[11] 3,546,424

| [72] | Inventor | H. Robert Howie, Jr. |
| --- | --- | --- |
| | | Watertown, Massachusetts |
| [21] | Appl. No. | 664,499 |
| [22] | Filed | Aug. 30, 1967 |
| [45] | Patented | Dec. 8, 1970 |
| [73] | Assignee | Dynatech Corporation |
| | | Cambridge, Massachusetts |

[54] AUTOMATIC ARC WELDER
14 Claims, 1 Drawing Fig.

| [52] | U.S. Cl. | 219/131 |
| --- | --- | --- |
| [51] | Int. Cl. | B23k 9/00 |
| [50] | Field of Search | 219/130, 131, 135 |

[56] References Cited
UNITED STATES PATENTS

| 2,957,977 | 10/1960 | Sullivan | 219/137X |
| --- | --- | --- | --- |
| 3,132,235 | 5/1964 | Anderson | 219/130X |
| 3,002,084 | 9/1961 | Sullivan | 219/131 |
| 3,330,933 | 7/1967 | Maklory | 219/135X |
| 3,371,242 | 2/1968 | Aldenhoff et al. | 219/135X |

*Primary Examiner*—J. V. Truhe
*Assistant Examiner*—C. L. Albritton
*Attorney*—Cesari and McKenna ABSTRACT: An inert gas welder strikes a pilot arc between a pilot electrode and a main electrode and uses the inert gas to transfer the arc to the workpiece. A novel electronic control unit automatically proceeds through this sequence and then extinguishes the arc after a prearranged duration. The control unit employs a shift register in which each stage controls one of the functions in the operating sequence. The durations of the active intervals of the respective stages are independently adjustable, thereby providing complete flexibility in tailoring the welding operation to the work to be performed.

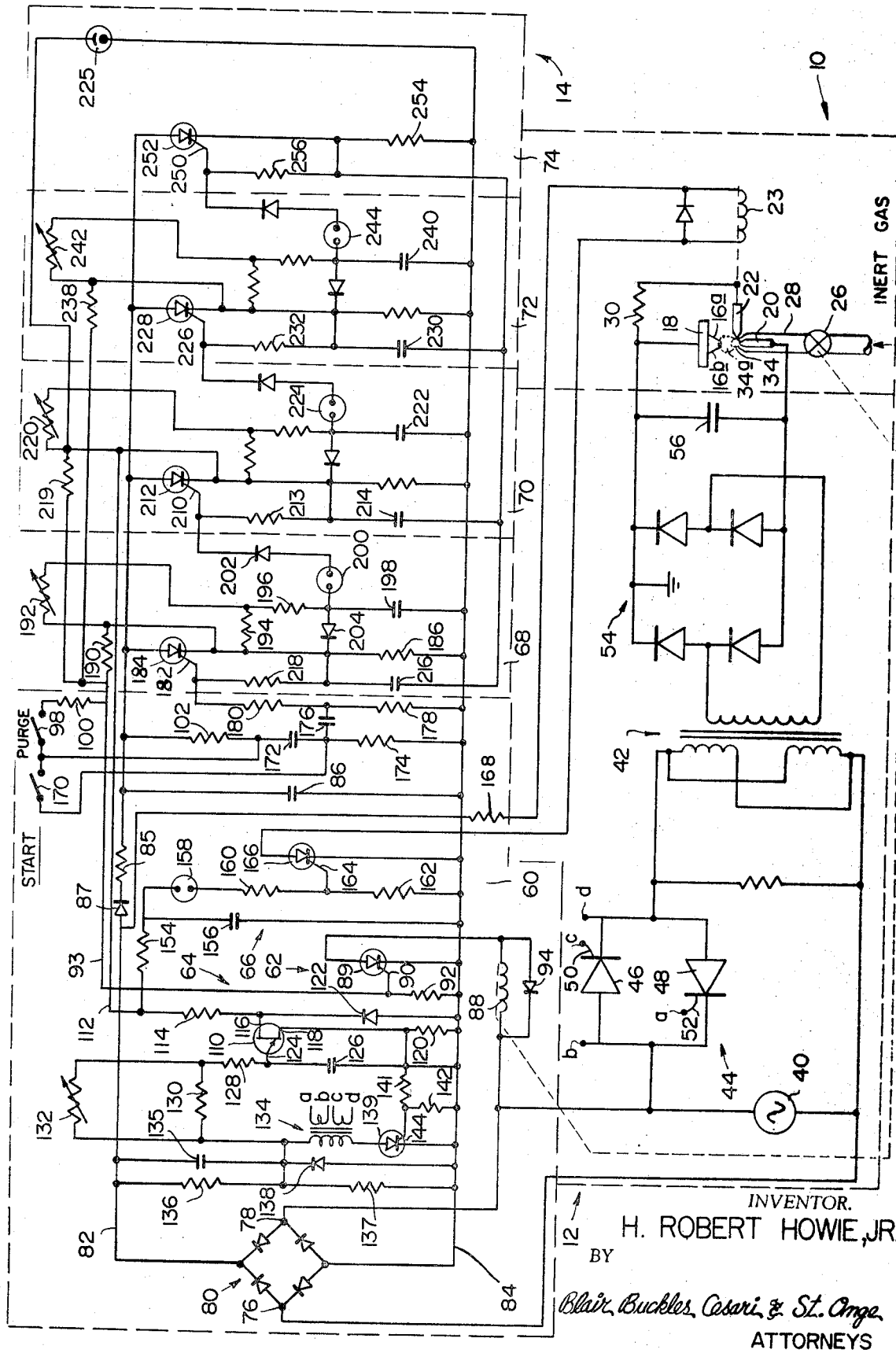

AUTOMATIC ARC WELDER

BACKGROUND OF THE INVENTION

1. Field of the Invention

The invention relates to the welding of small parts, particularly those requiring an inert atmosphere during the welding operation to prevent oxidation or other contamination of the workpieces. For example, in the fabrication of a thermocouple, the ends of a small pair of wires of different materials are joined together to form a thermoelectric junction. The junction is preferably made by welding the wires together and for optimum operation of the thermocouple, it should be free from contaminating substances. Therefore, the welding operation should be performed in an inert atmosphere, and further, there should be no contact between the workpiece and other electrodes when generating the welding arc.

2. Description of the Prior Art

The copending application of Harold F. Hodder for Ser. No. 539,252, filed Mar. 21, 1966, discloses a welder for small parts, such as thermocouples, in which the wires to be welded together are first secured in a hand-held fixture. The fixture is then inserted into a chamber containing the welding electrodes and a flow of inert gas through the chamber is begun. Next, a pilot arc is struck between a main electrode and a pilot electrode. This arc is carried by the inert gas to the workpiece, i.e. the two wires to be welded, so that a welding arc commences between the workpieces and the main electrode. This arc lasts for sufficient time to weld the workpieces and then it is extinguished. Finally, after the workpieces have cooled sufficiently, the gas is turned off.

The foregoing welder accomplishes the primary objectives of welding the workpieces in an inert atmosphere, while preventing contact between the workpieces and other electrodes. Moreover, it is a compact unit and relatively automatic in operation, thereby largely simplifying the fabrication of thermocouple junctions. In fact, it has found wide acceptance for this purpose. The present invention has as its main objective the improvement of this welder.

SUMMARY OF THE INVENTION

More specifically, it is an object of the present invention to provide an electric arc welder for the welding of small parts which is capable of automatic operation and is characterized by repeatability of various parameters which should be controlled for effective welding. These parameters include the intensity and duration of the welding arc. Another important parameter is the duration of inert gas flow through the welding chamber prior to commencement of the welding arc and after the arc is extinguished to prevent contamination of the welded parts by atmospheric constituents.

Another object of the invention is to provide a welder of the foregoing type in which the parameters are readily varied for operation on workpieces of different materials, sizes or configurations.

A further object of the invention is to provide a welder of the foregoing type which is compact, light in weight and reliable.

Yet another object of the invention is to provide a welder of the above type which is easily operated by relatively unskilled personnel.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

In brief, the present invention makes use of a shift register having a separate stage for each operation in the welding sequence. The operator initiates the welding sequence by actuating a switch making the first stage active. This energizes an electrically-controlled valve to turn on the flow of inert gas into the welding chamber. After a predetermined interval required for the purging of contaminating substances from the welding chamber, the second stage of the shift register becomes active and thereby deactivates the first stage. However, the second stage maintains the flow of inert gas and also turns on the welding current to initiate the welding arc.

Next, after a further predetermined interval the third stage of the shift register becomes active. It thereby deactivates the second stage to extinguish the welding arc, but it further maintains the gas flow through the welding chamber. Finally, after the workpiece has cooled to the point where it will be unaffected by the normal atmosphere constituents, a fourth stage becomes active and thereby deactivates the third stage to shut off the gas flow.

The direct current for the welding arc is derived from an alternating current source. Also, a phase control system using silicon-controlled rectifiers is used to control the welding current. This facilitates simple adjustment of the intensity of the arc.

The use of a shift register as described below to time the various functions in the operating sequence of the welder provides accurate, closely repeatable timing which, at the same time, is easily adjusted over a wide range. Moreover, the equipment used for the timing of each function is relatively inexpensive. Therefore, the overall system which times all of the functions, and thereby provides completely automatic operation, can be produced at a fairly low cost.

BRIEF DESCRIPTION OF THE DRAWING

For a fuller understanding of the nature and objects of the invention, reference should be had to the following detailed description taken in connection with the accompanying drawing, which is a schematic diagram of a welder embodying the present invention.

DESCRIPTION OF THE PREFERRED EMBODIMENT

Referring now to the drawing, the arc welder can be broken down generally into a work unit 10, a power supply unit 12 and a control unit 14.

In unit 10, the workpieces to be welded together, herein thermocouple wires 16a and 16b, are held in position by a chuck 18. The workpieces themselves form one main electrode of the welder. A second electrode 20 spaced from the workpieces constitutes the other main electrode. In addition, a retractable pilot electrode 22 is mounted at right angles to electrode 20 and is biased toward it so that the ends of electrodes 20 and 22 normally engage.

An inert gas is delivered by way of a valve 26 to a sleevelike nozzle 28 which surrounds electrode 20. The gas from nozzle 28 is directed towards the ends of the electrodes 20 and 22 and toward the workpieces 16a and 16b so as to form an inert gas shield around the welding area and thereby prevent contamination of the workpieces by constituents in the atmosphere.

After the inert gas has purged the area around the workpieces, control unit 14 activates power supply unit 12 which then applies a high potential between chuck 18 and electrode 20. Unit 12 also supplies power to pilot electrode 22 connected by way of a resistor 30 to chuck 18. Since electrodes 20 and 22 touch, the circuit including these two elements draws more current than the circuit containing electrode 20 and chuck 18.

At this point, control unit 14 activates solenoid 23, thereby retracting pilot electrode 22 and striking a pilot arc 34 between that electrode and main electrode 20. However, the inert gas jetting out through nozzle 28 toward workpieces 16a and 16b displaces arc 34 to workpieces 16a and 16b as indicated at 34d. Once the welding arc 34a is established, the current in the gap between electrodes 20 and 22 drops and is insufficient to sustain pilot arc 34.

Welding arc 34a persists until the welding process is complete. Whereupon, control unit 14 turns off power supply 12, shutting off the arc, Simultaneously, unit 14 deactivates solenoid 23 so that pilot electrode 22 resumes its position in engagement with electrode 20. Then, after the workpieces have cooled sufficiently to be unaffected by atmospheric constituents, control unit 14 turns off valve 26, stopping the gas flow from nozzle 28, and the cycle is completed.

A more detailed description of the various elements in work unit 10 may be found in the copending application of Harold F. Hodder, Ser. No. 539,252, filed Mar. 21, 1966, entitled A. W.

Power supply unit 12 comprises a source 40 which powers the primary of a transformer 42. An AC switch indicated at 44 is included in the primary circuit as part of a phase control arrangement to control the welding current as will be described in more detail later. Switch 44 comprises a pair of conventional silicon control rectifiers 46 and 48 connected in parallel so as to pass forward current in opposite directions. Rectifiers 46 and 48 are turned on and off repeatedly, each one-half cycle of source 40 in response to signals applied to their gate terminals 50 and 52, respectively, by control unit 14.

The secondary of transformer 42 is connected to a conventional bridge rectifier indicated at 54. One output terminal of rectifier 54 is connected to work electrode 20 and the other rectifier output terminal is connected to chuck 18 and by way of resistor 30 to pilot electrode 22.

The valve of resistor 30 is fairly critical. If its resistance is too large, there is insufficient current in the pilot electrode circuit to strike the pilot arc 34. On the other hand, if resistor 30 is too small, the pilot electrode circuit draws too much current and may burn out the individual diodes in rectifier 54. Also, desirably, a capacitor 56 is connected across the output terminals of rectifier 54 to smooth out the signal applied to work unit 10.

Turning now to control unit 14, it is seen to comprise a main control stage 60 which, in turn, includes a gas control section 62, an arc control section 64 and a pilot electrode retraction control section 66. Unit 14 also has a series of four timing stages 68, 70, 72 and 74 which control the operation of the three control sections in stage 60. Timing stages 68, 70, 72 and 74 operate in much the same manner as the stages in a shift register. That is, each timing stage activates the next succeeding stage in the set so that the outputs from the four stages are delayed or staggered by predetermined amounts.

During normal operation of the system, the operator activates the first timing stage 68. Timing stage 68, in turn, activates gas control section 62 which opens solenoid actuated valve 26 in work unit 10 to establish the inner inert gas shield around the workpieces. Then, after a suitable delay, timing stage 68 activates timing stage 70 which turns off stage 68 and takes over control of the gas control 62 to maintain the flow of gas in unit 10.

Also, timing stage 70 activates arc control section 64 which then turns on power unit 12 to generate the arcs in work unit 10. Shortly thereafter, the same signal from timing stage 70 activates the retraction control section 66 which energizes solenoid 23, thereby retracting pilot electrode 22. Finally, after a determined interval of time sufficient to complete the welding process, timing stage 70 activates timing stage 72. Stage 72, in turn, deactivates stage 70, thereby disabling the arc control section 64 and the retraction control section 66. Whereupon, power supply unit 12 is shut off, thereby extinguishing the welding arc and pilot electrode 22 returns to its unretracted position against electrode 20.

Timing stage 72 also takes over control of gas control section 62 to continue the flow of gas in unit 10 even after completion of the welding process. Then, after the workpieces have had time to cool, stage 72 activates the final timing stage 74 which, in turn, deactivates stage 72. With the deactivation of stage 72, gas control section 62 is disabled, thereby closing valve 26 and shutting off the supply of inert gas to unit 10.

Control unit 14 is also powered by source 40 in power supply unit 12. Thus, source 40 is connected to the input terminals 76 and 78 of a bridge rectifier 80 in control stage 60. The rectified AC output signal from rectifier 80 appears a cross buses 82 and 84, the latter serving as ground. An in-line resistor 85, in bus 82 together with the capacitor 86 connected between buses 82 and 84 form a filter which filters the output from rectifier 80 being applied to timing stages 68, 70, 72 and 74. This insures that the timing stages will generate the same set of accurately-timed control signals for stage 60 during each operating cycle. A diode 87 connected in bus 82 ahead of resistor 85 isolates the filtered DC signal being applied to the timing stages from the unfiltered signal required in stage 60 and specifically in section 64 thereof.

Control section 62 includes a solenoid 88 which actuates valve 26 in unit 10. Solenoid 88 is connected between terminal 78 of rectifier 80 and the anode of a silicon control rectifier 89. The cathode of rectifier 89 is connected directly to bus 84 and its gate terminal 90 is connected via a biasing resistor 92 to bus 84. The control signals for control section 62 are received by way of a line 93 connected to gate terminal 90. A positive signal applied to gate terminal 90 causes rectifier 89 to conduct. Whereupon, unrectified AC from rectifier 80 energizes solenoid 88, thereby opening valve 26 in section 10. A current limiting diode 94 is connected across solenoid 88 to protect it. Coil 88 remains energized so long as the signal persists on gate terminal 90.

Normally, control section 62 is activated by a signal on line 93 from timing stages 68, 70 or 72. However, means are also provided for activating it independently of the timing stages to purge the gas lines and the welding area before the actual welding operation commences. This may occur, for example, at the beginning of the day's operations.

More particularly, one terminal of a normally open switch 98 is connected by way of a resistor 100 to line 93. The other terminal of switch 98 is coupled via a resistor 102 to bus 82 beyond resistor 85. The closing of switch 98 applies a positive signal to gate terminal 90 of rectifier 89 which then conducts and initiates the purging process. Gas continues to flow in unit 10 as long as the operator maintains switch 98 in the closed position.

Arc on control section 64 comprises a unijunction transistor 110. The signal for activating section 64 comprises a unijunction transistor 110. The signal for activating section 64 arrives from timing stage 70 on a line 112 connected via resistor 114 to one base terminal 116 of transistor 110. The other base terminal 118 of transistor 110 is connected via a load resistor 120 to bus 84. Also, a zener diode 122 is included between terminal 116 and bus 84 to limit the current flowing through transistor 110.

The control terminal 124 of transistor 110 is connected by way of a capacitor 126 to bus 84, and also by a series parallel resistance network composed of resistors 128, 130 and 132, the last of which is variable, to one end of the primary of a transformer 134. The same primary end is coupled by way of capacitor 135 and resistor 136 connected in parallel to bus 82 and via resistor 137 and zener diode 138 connected in parallel to bus 84. The purpose of diode 138 is so that capacitor 126 will charge from a constant voltage source. The other end of the primary winding of transformer 134 is connected to the anode of silicon controlled rectifier 139 whose cathode is coupled directly to bus 84. The part of the voltage across load resistor 120 is applied by way of a voltage dividing network composed of resistors 141 and 142 to the gate terminal 144 of rectifier 139.

Transformer 134 has a split secondary winding whose terminals $a$, $b$, $c$ and $d$ are connected directly to similarly lettered terminals on switch 44 in unit 12. Thus, one secondary winding controls rectifier 46 and the other controls rectifier 48.

As will be described presently, control section 64 in conjunction with switch 44 make up a phase control system which controls the welding current applied by unit 12 to unit 10. It affords a simple means for accurately adjusting the intensity of the welding arc to suit a given application.

Arc control section 64 is enables by a positive signal on line 112 from timing stage 70. Transistor 110 conducts when the voltage at its control terminal 124 exceeds a predetermined percentage of the voltage at the base thereof. This, in turn, depends upon the charge constant associated with capacitor 126 connected to control terminal 124 which is directly related to the value of variable resistor 132. By adjusting the value of variable resistor 132, the length of time during which transistor 110 is conducting may be controlled. This, in turn, determines the intensity of the welding arc generated in unit 10.

More particularly, rectifier 80 supplies a rectified unfiltered AC signal to the control terminal 124 of transistor 110. This signal drops to essentially zero volts at the beginning of each one-half cycle of source 40.

Thus, even though stage 70 is applying a signal to section 64 on line 112, transistor 110 stops conducting every one-half cycle. During the portion of the cycle when transistor 110 is conducting, the voltage drop across resistor 120 gates rectifier 139. When rectifier 139 conducts, capacitor 135 discharges through transformer 134, thereby gating rectifiers and 48 in switch 44 and turning on the welding current. Capacitor 135 is in the nature of a high frequency bypass for resistor 136 to insure that sufficient current is developed to energize transformer 134. At each one-half cycle during the recharging of capacitor 135 through resistor 137, there is a polarity reversal.

Due to transistor 110, charge cannot build up on capacitor 126 until a signal is received from timing stage 70. However, the adjustment of resistor 132 controls the rate at which capacitor 126 charges to the point required to fire transistor 110. That is, transistor 110 can be made to conduct sooner or later in each one-half cycle period. This, in turn, controls the length of time during each one-half cycle that transistor 110 is conducting and, therefore, the "on" time of switch 44 controlling welding current. The longer switch 44 is on during each one one-half cycle, the more intense is the arc generated in unit 10.

The value of resistor 154 is carefully selected so that the capacitors discharge fully each one-half cycle.

Rectifier 139 performs a double function. First, it functions as an amplifier and, second, it pulls down the voltage across capacitor 126 to zero volts at the beginning of each one-half cycle to provide the proper initial control voltage at terminal 124 of transistor 110.

The same signal from timing stage 70 on line 112 also activates retraction control section 66. However, section 66 delays the signal somewhat so that it initiates retraction of pilot electrode 22 only after control section 64 has first energized power supply unit 12.

More particularly, the signal on line 112 is coupled by way of a resistor 154 to a parallel network whose one leg is composed of a capacitor 156 connected to bus 84 and whose other leg consists of a neon bulb 158 and a pair of resistors 160 and 162, the latter of which is also connected to bus 84. The gate terminal 164 of a silicon controlled rectifier 166 is connected to the junction of resistors 160 and 162 which function as biasing resistors. The cathode of rectifier 166 is connected directly to bus 84 while its anode is coupled to one end of solenoid 23 in work unit 10. The other end of solenoid 23 is connected by way of a resistor 168 to bus 82 ahead of isolating diode 87.

When a signal appears on line 112, a charge starts to build up on capacitor 156. After a suitable delay sufficient to allow the activation of arc control section 64, the charge on capacitor 156 is sufficient to fire neon bulb 158. This triggers rectifier 166, thereby energizing solenoid 23 which retracts pilot electrode 22.

In addition to performing the delay function noted above, the charge on capacitor 156 changes polarity each half cycle of the signal from rectifier 80. Thus, it prevents deenergization of solenoid 23 during each half cycle as might cause pilot electrode 22 to jitter toward and away from electrode 20.

Rectifier 166 conducts and, therefore, pilot electrode 22 remains retracted only as long as timing stage 70 applies a signal to line 112.

As noted above, the timing of the activation of control sections 62, 64 and 66 is controlled by timing stages 68, 70, 72 and 74. Stages 68, 70 and 72 are identical and operate in much the same way. Accordingly, we will describe in detail only stage 68. The last stage 74, being different from the other three, will be described in detail later.

Automatic operation of the system is initiated by activating timing stage 68. This is a accomplished by momentarily closing the switch 170 in control stage 60. Switch 170 is connected across a capacitor 172, one side of which is connected via resistor 102 to bus 82 and the other side of which is connected by way of a resistor 174 to bus 84. The closing of switch 170 short circuits capacitor 172, thereby raising the potential across resistor 174. The resulting signal is coupled via a capacitor 176 and a voltage divider network composed of resistors 178 and 180 to activate the first timing stage 68. Specifically, the signal is applied to the gate terminal 182 of a silicon controlled rectifier 184 in stage 68. The anode of rectifier 184 is connected to bus 82 while its cathode is connected by way of a resistor 186 to bus 84.

The output from silicon controlled rectifier 184 is taken from its cathode and fed back by way of a resistor 190 to line 93 to turn on gas control section 62 as described above.

The output from rectifier 184 is also applied by way of a resistive network composed of parallel connected variable resistor 192 and resistor 194 in series with a resistor 196 connected to one side of a capacitor 198, the other side of which connects with bus 84. When rectifier 184 conducts, it charges capacitor 198 through the resistive network including variable resistor 192. The rate at which capacitor 198 charges can be increased or decreased by appropriately varying resistor 192. When capacitor 198 carries a determined charge, it fires a neon bulb 200 connected between the junction of resistor 196 and capacitor 198 and a diode 202. Diode 202 is connected to conduct forward current to a activate the next timing stage 70. Thus, by adjusting resistor 192, one can critically control the delay between the commencement of gas flow in unit 10 and the beginning of the welding step initiated by stage 70.

A diode 204 is connected between the junction of resistor 196 and capacitor 198 and the junction of resistors 186 and 194 so as to pass forward current through resistor 186 to bus 84. Resistor 186 provides holding current for diode 204 so as to provide a fast discharge path for capacitor 198 through diode 204 to bus 84.

Thus, the activation of the second timing stage 70 depends upon the setting of resistor 192. The setting is such as to provide a sufficient lead time to enable the gas to completely purge the welding area prior to commencement of the welding arc.

The output signal coupled from stage 68 to stage 70 is applied to the gate terminal 210 of a silicon controlled rectifier 212. The input signal to stage 70 is also applied via a resistor 213 to charge a capacitor 214 in stage 70. The charge on capacitor 214 is coupled back to charge a similar capacitor 216 connected directly to the cathodes of rectifier 184 and diode 204 and by way of a resistor 218 to the gate terminal 182 of rectifier 184. The signal applied to the cathode of rectifier 184 cuts off the rectifier and thereby terminates the output signal applied therefrom to line 93.

However, with the activation of the second timing stage 70, and output signal is coupled by way of a resistor 219 to line 93 to maintain activation to gas control section 62.

In addition, the same output signal is applied to line 112, thereby activating arc control section 64 and after suitable delay, retraction section 66.

Timing stage 70 operates in exactly the same way as stage 68. That is, after a length of time determined by the adjustment of a variable resistor 220 therein, a capacitor 222 charges sufficiently to fire a neon bulb 224, thereby coupling a signal from stage 70 to activate the third timing stage 72.

A neon pilot light 225 connected between bus 84 and the junction of resistors 219 and 220 is lit whenever timing stage 70 is activated. Therefore, it serves to warn the operator whenever welding current is applied to the electrodes in work unit 10. As noted above, section 64 is not activated until a signal is received on line 112, i.e. after light 225 is lit.

The signal from stage 70 is applied to the gate terminal 226 of a silicon controlled rectifier 228 in stage 72. The same signal also charges a capacitor 230 through a resistor 232 in that stage. The charge on capacitor 230 is coupled back to capacitor 214 in stage 70 and applied to the cathode of rectifier 212 cutting it off. Thereupon, the output signal from stage 70 applied to both lines 93 and 112 ceases. Thus, by proper adjustment of resistor 220, the duration of the welding arc in unit 10 may be accurately controlled.

In the meantime, however, the output signal appearing at the cathode of rectifier 228 is fed back by way of a resistor 238 to line 93 so as to continue the actuation of gas control unit 62 and maintain the gas flow in work unit 10.

As with the previous timing stages, as soon as rectifier 228 conducts, a charge starts to build up on a capacitor 240 in stage 72, the charging rate being determined by the adjustment of a variable resistor 242. When the charge exceeds a critical value, it causes a neon bulb 244 to conduct, thereby activating the fourth timing stage 74.

The adjustment of resistor 242 is such as to delay activation of stage 74 for a sufficient length of time after cessation of the welding arc to allow the workpieces in unit 10 to cool. At this point, the signal from stage 72 is applied to gate terminal 250 of the silicon controlled rectifier 252 in stage 74. The anode of rectifier 252 is connected directly to bus 82 and its cathode is connected by way of a resistor 254 to bus 84. The signal applied to gate terminal 250 is also coupled back by way of a resistor 256 to charge capacitor 230 and cut off rectifier 228. Thereupon, the output signal applied by stage 72 to line 93 ceases and gas control section 62 is deactivated. This marks the end of a complete operating cycle of the automatic welder. Workpieces 16a and 16b, fully cooled, can then be removed from chuck 18 and the process repeated.

As seen from the foregoing, my welding apparatus is fully automatic. It has a separate stage for controlling each step in the welding sequence. Thus, shielding gas is applied to the workpieces before, during and after the actual welding operation to insure that the workpieces are isolated from contaminants in the atmosphere. Also, the system precisely controls the intensity and duration of the welding arc to suit the workpieces being welded at any given time. Yet, the time duration of each of the various operations is easily adjustable over a relatively wide range. Finally, these objectives are accomplished using conventional electrical components which can be manufactured and assembled at relatively low cost.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

I claim:

1. In an arc welder of the type having a main electrode, a retractable pilot electrode and a source of inert gas for shielding the work being welded from the atomosphere:
   A. a source of welding current for said electrodes; and
   B. a shift register having a plurality of stages:
   1. each stage after the first being enabled by the previous stage;
   2. one register stage being connected to turn on said gas source when enabled;
   3. another register stage being connected to turn on said current source when enabled;
   4. a third register stage being connected to turn off said current source when enabled; and
   5. a fourth stage connected to turn off said gas source when enabled.

2. An arc welder as defined in claim 1 wherein each register stage includes means for adjustably delaying the enabling of the succeeding stage in the register.

3. An arc welder as defined in claim 1:
   A. wherein said source provides a signal having an alternating waveform; and
   B. means for controlledly interrupting the AC signal from said source during a part of each cycle thereof so as to control the intensity of the welding arc.

4. In an arc welder of the type having a main electrode, a retractable pilot electrode and a source if inert gas for shielding the arc from the atmosphere, the improvement comprising:
   A. a source of welding current for said electrodes; said current having an alternating waveform;
   B. a phase control system controlling said welding current so as to interrupt said current from said current source during a portion of each cycle thereof and thereby control the intensity of the welding arc; and
   C. control means including a shift register for automatically turning on the gas, turning on the current to the electrodes, turning off the current and then turning off the gas, all in an ordered sequence.

5. An arc welder as defined in claim 4 and further including means for rectifying the interrupted AC signal from said current source prior to applying it to said electrodes.

6. An arc welder of the type having a main electrode, a rectractable pilot electrode and a source of inert gas for shielding the arc from the atmosphere, the improvement comprising:
   A. a source of welding current for said electrodes, said current having an alternating waveform;
   B. a phase control system controlling said welding current so as to interrupt said current from said current source during a portion of each cycle thereof and thereby control the intensity of the welding arc; and
   C. a shift register having a plurality of stages which are successively enabled to produce output signals;
   1. the output signal from one stage of said register controlling the flow of gas from said gas source; and
   2. the output signal from another stage of said register controlling the activation of said phase control systems.

7. An arc welder as defined in claim 6 wherein the output signal from said other stage also controls the retraction of said pilot electrode.

8. An arc welder as defined in claim 6 wherein said register includes:
   A. means for adjustably delaying the enabling of said other register stage for a first selected period of time after enabling of said one stage; and
   B. means for adjustably delaying the disabling of said one stage for a second selected period of time after disabling of said other stage.

9. An arc welder of the type having a main electrode, a retractable pilot electrode and a source of inert gas for shielding the arc from the atmosphere, the improvement comprising:
   A. a source of welding current for said electrodes, said current having an alternating waveform; and
   B. a phase control system controlling said welding current so as to interrupt said current from said current source during a portion of each cycle thereof and thereby control the intensity of the welding arc, wherein said phase control system includes:
   1. an AC switch connected to said current source; and
   2. a control unit, said unit comprising;
      a. means for generating a rectified AC signal,
      b. means operative in response to said rectified signal for gating said switch; and
      c. means connected to receive said rectified signal for activating said gating means during only a selected portion of each one-half cycle of said rectified signal from said generator means so that said switch is turned on during only a determined part of each one-half cycle of said current source.

10. An arc welder as defined in claim 9:
A. wherein said activating means comprises a unijunction transistor which actuates said gating means only when
   1. it is conducting; and
   2. stops conducting each one-half cycle of the signal from said generating means; and
B. further including means for adjustably controlling the point in each one-half cycle at which said transistor ceases to conduct.

11. An arc welder as defined in claim 10 wherein said controlling means comprises:
A. a capacitor connected to the control terminal of said transistor, said capacitor charging at a preselected rate to fire said transistor; and
B. a variable resistor operatively connected to said capacitor for adjustably controlling its charging rate.

12. An arc welder as defined in claim 9 and further including a timing system, said system:
A. turning on said flow of gas from the gas source for a determined period of time; and
B. enabling said actuating means only during a selected interval in said period.

13. An arc welder comprising:
A. means for holding workpieces,
B. a work electrode;
C. a retractable pilot electrode;
D. means for supplying inert gas to shield the workpieces from the atmosphere;
E. a source of welding current for said electrodes, said current having an alternating waveform;
F. switch means connected to said current source for controlling the current to said electrodes;
G. a first control section for controlling said gas supply means;
H. a second control section for controlling said switch means;
I. a third control section for controlling the retraction of said pilot electrode; and
J. a shift register operatively associated with said control sections:
   1. one stage of said register activating said first control section to means;
   2. another register stage activating said second and third control sections to turn on said switch and initiate retraction of said pilot electrode a selected interval of time after the activation of said first section;
   3. a third register stage deactivating said second and third control sections after a second selected interval of time; and
   4. a fourth register stage deactivating said first control section a third selected interval of time after deactivation of said second and third control sections.

14. An arc welder as defined in claim 13 and further including a phase control system for controlling the intensity of the welding arc, said control system comprising means for periodically deactivating said second section during a selected portion of each cycle of the signal from said current source so as to periodically open said switch and apply to said electrodes only a selected portion of the AC signal from said current source during each cycle thereof.